(12) United States Patent
Lekar

(10) Patent No.: US 12,115,914 B2
(45) Date of Patent: Oct. 15, 2024

(54) VEHICLE-BODYWORK PART AND WING-MIRROR ARRANGEMENT FOR A VEHICLE-BODYWORK PART

(71) Applicant: BOS GmbH & Co. KG, Ostfildern (DE)

(72) Inventor: Jan Lekar, Ostfildern (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 18/354,086

(22) Filed: Jul. 18, 2023

(65) Prior Publication Data

US 2024/0025341 A1    Jan. 25, 2024

(30) Foreign Application Priority Data

Jul. 22, 2022 (DE) .......................... 102022207511.0

(51) Int. Cl.
| | |
|---|---|
| *B60J 1/20* | (2006.01) |
| *B60R 1/074* | (2006.01) |
| *B60R 1/12* | (2006.01) |
| *B60R 11/04* | (2006.01) |
| *B60R 11/00* | (2006.01) |

(52) U.S. Cl.
CPC ............... *B60R 1/074* (2013.01); *B60R 1/12* (2013.01); *B60R 11/04* (2013.01); *B60R 2001/1253* (2013.01); *B60R 2011/004* (2013.01); *B60R 2011/0092* (2013.01)

(58) Field of Classification Search
CPC B60R 1/074; B60R 1/12; B60R 11/04; B60R 2001/1253; B60R 2011/004; B60R 2011/0092; B60R 2011/082; B60R 2011/0094; B60R 1/06; B60R 2011/0084; F16G 11/12
See application file for complete search history.

(56) References Cited

U.S. PATENT DOCUMENTS

| | | | |
|---|---|---|---|
| 2016/0303950 A1* | 10/2016 | Lekar | B60J 1/2061 |
| 2019/0209878 A1* | 7/2019 | Newing | F16G 11/12 |
| 2021/0237716 A1* | 8/2021 | Prasad | H04N 23/90 |
| 2021/0362653 A1 | 11/2021 | Beauregard et al. | |
| 2022/0396206 A1* | 12/2022 | Miles | B60R 1/078 |
| 2023/0069254 A1* | 3/2023 | Howell | B60R 11/04 |
| 2023/0302995 A1* | 9/2023 | Henion | B60R 1/12 |
| 2024/0083360 A1* | 3/2024 | Kim | G02B 5/32 |

* cited by examiner

Primary Examiner — Amy J. Sterling
(74) Attorney, Agent, or Firm — FLYNN THIEL, P.C.

(57) ABSTRACT

Vehicle-bodywork part including a bodywork aperture and a wing-mirror arrangement with a carriage unit, or a wing-mirror arrangement for a vehicle-bodywork part including such a carriage unit. The carriage unit carries an optical detection device and is displaceable between a rest position, in which the carriage unit is recessed in a flush state in the bodywork aperture, and an operating position, in which the carriage unit extends out of the bodywork aperture. A drive system is coupled to the carriage unit to displace same between the rest and the operating positions. The drive system has a cable-pull arrangement deflected around at least one deflecting roller. An elastically compliant securing device is provided, the securing device being tensioned between opposite cable strands of the cable-pull arrangement in the region of the deflecting roller, in order to avoid disengagement of a cable strand from the deflecting roller.

4 Claims, 4 Drawing Sheets

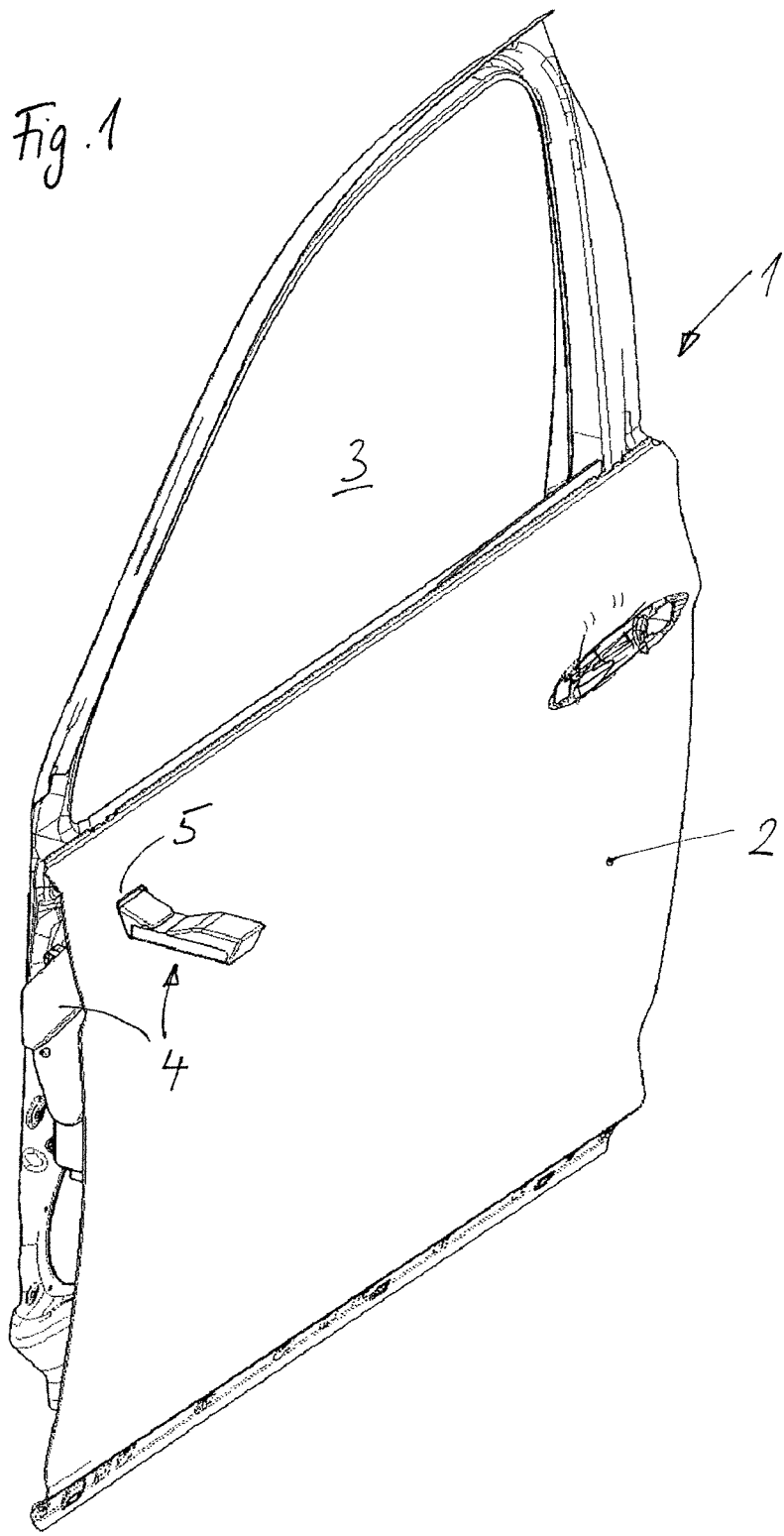

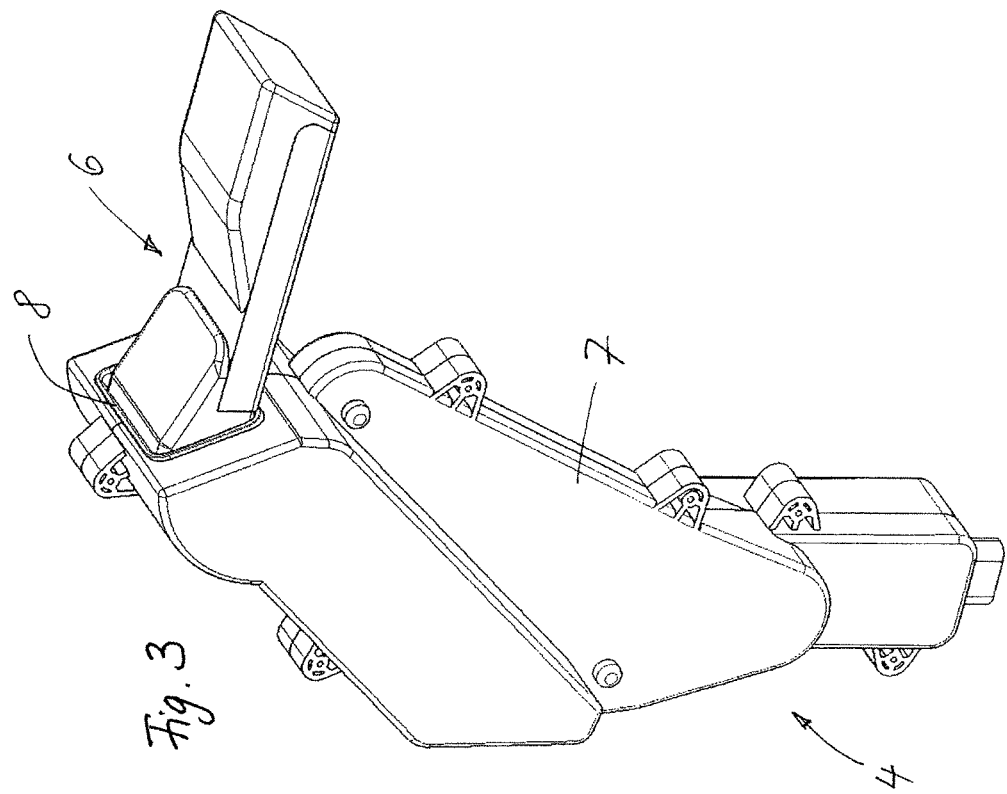
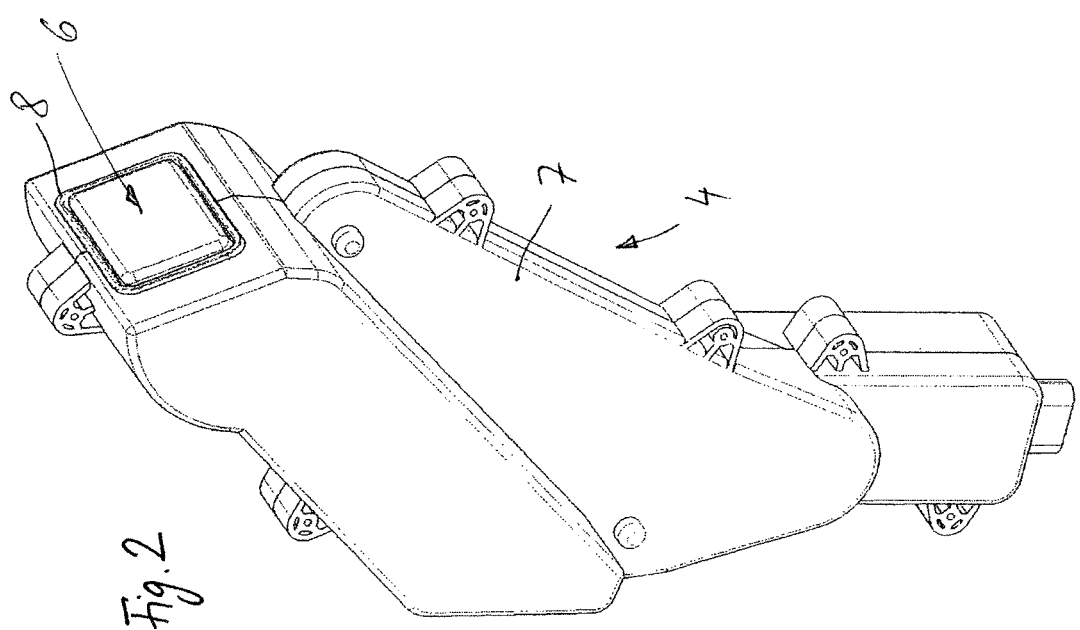

VEHICLE-BODYWORK PART AND WING-MIRROR ARRANGEMENT FOR A VEHICLE-BODYWORK PART

CROSS-REFERENCE TO RELATED APPLICATION

This claims priority from German Application No. 10 2022 207 511.0, filed Jul. 22, 2022, the disclosure of which is hereby incorporated by reference in its entirety.

TECHNICAL FIELD

The invention relates to a vehicle-bodywork part and to a wing-mirror arrangement.

BACKGROUND AND SUMMARY

US 2021/0362653 A1 discloses a passenger-vehicle side door which is provided with a wing-mirror arrangement. The wing-mirror arrangement has a camera, which is mounted on a carriage unit such that it can be moved between a rest position, in which it is arranged in a flush state within the outer contour of the vehicle, and a functional position, in which it has been displaced outwards beyond the outer contour of the vehicle. Depending on the condition of the vehicle, the camera can automatically be displaced into the rest position or into the functional position.

A vehicle-bodywork part in the form of a side door of a passenger vehicle is generally known. A wing-mirror arrangement is fastened on the side door, this arrangement being mounted on the door level with a side-window aperture of the side door.

It is also generally known, in respect of a drive system with a cable-pull arrangement, for the cable-pull arrangement to be secured in the region where the cable pull is deflected via a deflecting roller, in order to avoid the situation where the cable pull disengages from the deflecting roller in an unintended manner during operation of the cable-pull arrangement.

It is an object to create a vehicle-bodywork part and a wing-mirror arrangement which are of the type mentioned in the introduction and ensure long-term functioning. In respect of the vehicle-bodywork part, it is also an object of the invention to combine an aerodynamically advantageous design with convenient and functional use of the vehicle-bodywork part.

In respect of the vehicle-bodywork part, same includes a bodywork aperture and a wing-mirror arrangement with a carriage unit. The carriage unit carries an optical detection device and can be displaced between a rest position, in which the carriage unit is recessed in a flush state in the bodywork aperture, and an operating position, in which the carriage unit has been extended out of the bodywork aperture in the outward direction. A drive system is provided, the drive system being coupled to the carriage unit in order to displace the carriage unit between the rest position and the operating position. The drive system has a cable-pull arrangement, which is deflected around at least one deflecting roller, and an elastically compliant securing device is provided. The securing device is tensioned between opposite cable strands of the cable-pull arrangement in the region of the deflecting roller, in order to avoid the situation where a cable strand disengages from the deflecting roller. In the rest position of the carriage unit, an outer contour of the vehicle-bodywork part is largely smooth-surfaced and, accordingly, aerodynamically advantageous. In the operating position, in contrast, full use can be made of the optical detection device, which captures static and moving images to the side or to the rear of the vehicle-bodywork part. The drive system, which preferably has an electric drive motor, makes it possible for the optical detection device to be automatically, and therefore conveniently, retracted and extended. The optical detection device is either an electronic image-data-capturing device, such as in particular a camera, or an optical mirror glass, which reflects corresponding images to a driver of a corresponding motor vehicle.

The drive system has a cable-pull arrangement, which is deflected around at least one deflecting roller, and an elastically compliant securing device is provided, the securing device being tensioned between opposite cable strands of the cable-pull arrangement in the region of the deflecting roller, in order to avoid the situation where a cable strand disengages from the deflecting roller. The cable-pull arrangement allows the carriage unit to be retracted and extended particularly quietly. On the one hand, the elastically compliant securing device ensures reliable and long-term functioning of the cable-pull arrangement. On the other hand, it serves to subject the cable-pull arrangement to permanent cable tensioning.

In one configuration, the securing device has two sliders, which are connected to one another via a spring arrangement and are mounted in a floating manner on a respective cable strand, and each slider is assigned in each case at least one stationary axial stop, which ensures a constant spacing between the respective slider and the deflecting roller—as seen in the longitudinal direction of the respective cable strand. The configuration is advantageous particularly when the opposite cable strands are guided in a V-shaped manner in relation to the deflecting roller. The configuration ensures that, during operation of the cable-pull arrangement, the sliders do not come into contact with the deflecting roller, which could impair the functioning of the cable-pull arrangement.

In respect of the wing-mirror arrangement, same has a carriage unit, which carries an optical detection device and can be displaced between a rest position, in which the carriage unit is recessed in a flush state in the bodywork aperture, and an operating position, in which the carriage unit has been extended out of the bodywork aperture in the outward direction. A drive system is provided, the drive system being coupled to the carriage unit in order to displace the carriage unit between the rest position and the operating position. The drive system has a cable-pull arrangement, which is deflected around at least one deflecting roller. An elastically compliant securing device is provided, the securing device being tensioned between opposite cable strands of the cable-pull arrangement in the region of the deflecting roller, in order to avoid the situation where a cable strand disengages from the deflecting roller.

A preferred exemplary embodiment of the invention will be described hereinbelow and is illustrated with reference to the drawings, in which:

FIG. 1 shows an embodiment of a vehicle-bodywork part in the form of a side door for a passenger vehicle;

FIG. 2 shows a perspective illustration of an embodiment of a wing-mirror arrangement with a carriage unit, which carries an optical detection device, in its rest position;

FIG. 3 shows the wing-mirror arrangement according to FIG. 2 with the carriage unit in an operating position;

DETAILED DESCRIPTION

Figure 4:
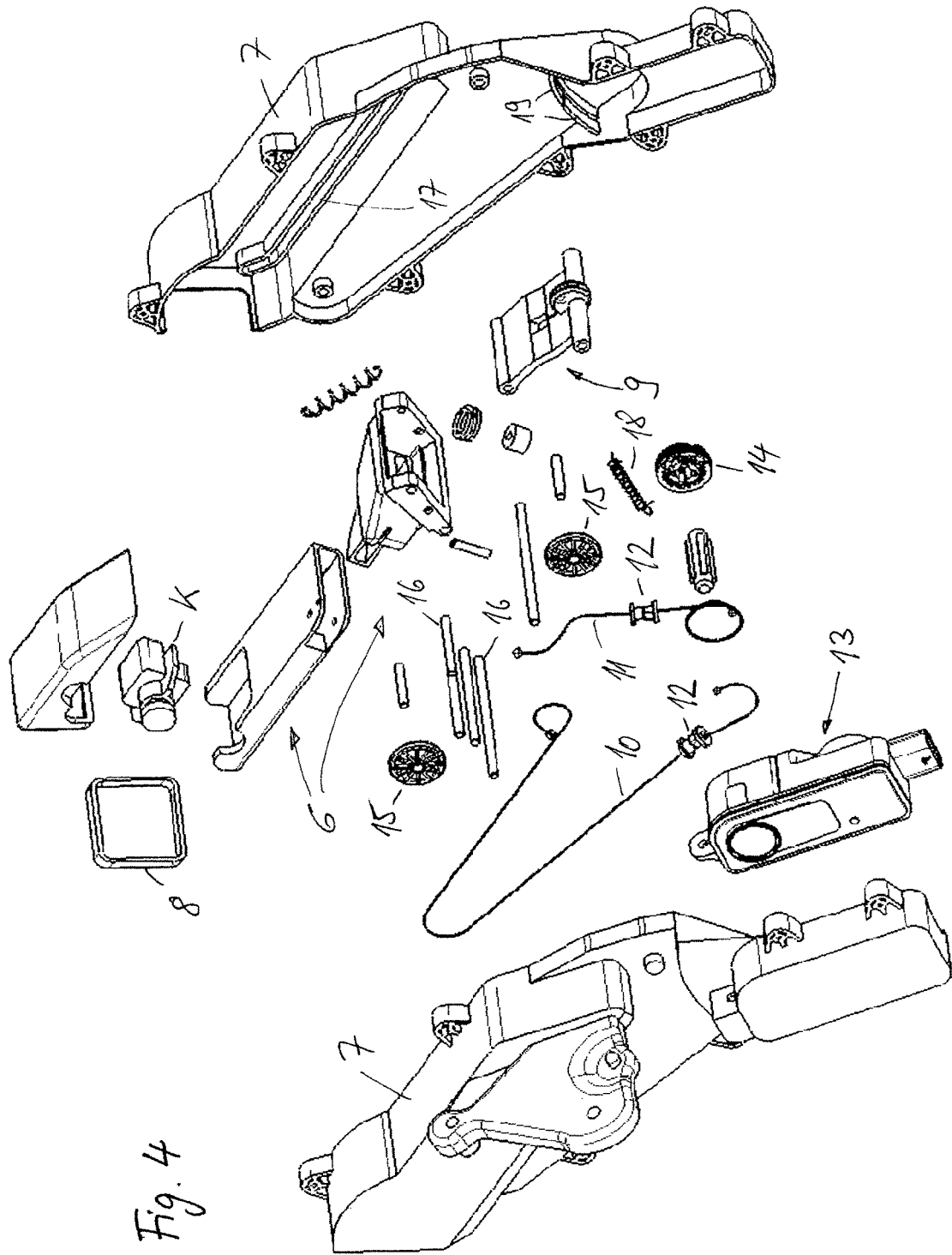
FIG. 4 shows a perspective exploded illustration of the wing-mirror arrangement according to FIGS. 2 and 3 with a drive system.

A vehicle-bodywork part 1 in the form of a side door according to FIG. 1 is a left-hand, driver's-side side door of a passenger vehicle. The vehicle-bodywork part 1 has an outer door panel 2, which is assigned a door handle (not defined in any more detail). A side-window aperture 3 is provided above the outer door panel 2 and is surrounded by a door frame of the side door. The outer door panel 2 has a bodywork aperture 5, which is arranged beneath a lower edge of the side-window aperture and at a distance in front of the door handle. The bodywork aperture 5 is assigned a wing-mirror arrangement 4, which is illustrated in detail with reference to FIGS. 2 to 5. The wing-mirror arrangement 4 has a carriage unit 6, which is mounted such that it can be retracted and extended in a carrier structure 7 designed in the form of a double-shell housing. The carrier structure 7 is fastened on the door on the inside of the outer door panel 2. The carrier structure 7, in the form of the double-shell housing, has a through-passage 8 for the carriage unit 6 on its upper end region, this through-passage being in alignment with the bodywork aperture 5. The carriage unit 6 can be displaced through the through-passage 8, and the bodywork aperture 5, between the rest position, which is illustrated with reference to FIGS. 2 and 5, and the operating position, which can be seen in FIGS. 1 and 3. This means that, in its rest position, the wing-mirror arrangement 4 is arranged such that it is recessed in a flush state in the outer door panel 2. In the operating position, the carriage unit 6 of the wing-mirror arrangement 4 projects in the transverse direction of the vehicle and out of the outer door panel 2 in the outward direction.

The carriage unit 6 carries an optical detection device, in this case in the form of a camera K, of which the camera lens is oriented rearward in the longitudinal direction of the vehicle when the wing-mirror arrangement 4 is in the operating position. The carriage unit 6 is displaced between the rest position and the operating position by means of a drive system, which can be seen to good effect with reference to FIGS. 4 and 5.

The drive system has an electric drive motor 13, which is integrated in the double-shell housing of the carrier structure 7. The drive system also has a cable-pull arrangement, which is made up of two cable-pull portions 10 and 11. The drive system has a drive roller 14 and also two deflecting rollers 15, over which the cable-pull arrangement is guided. The drive roller 14 is driven by the drive motor 13. The two cable-pull portions 10 and 11 are connected to a carriage body 9, which in turn is connected to the carriage unit 6 in an articulated manner. The carriage unit 6 is mounted such that it can be displaced in opposite guide tracks 17 of the double-shell housing of the carrier structure 7 with the aid of sliding-guidance pins 16. Since both cable-pull portions 10 and 11 act on the carriage body 9, a rotary movement of the drive roller 14 inevitably results in the carriage body 9 being displaced along the track guides 17 in one direction or the other. This also inevitably achieves the desired retraction or extension movement of the carriage unit 6, which is coupled to the carriage body 9.

Figure 5:
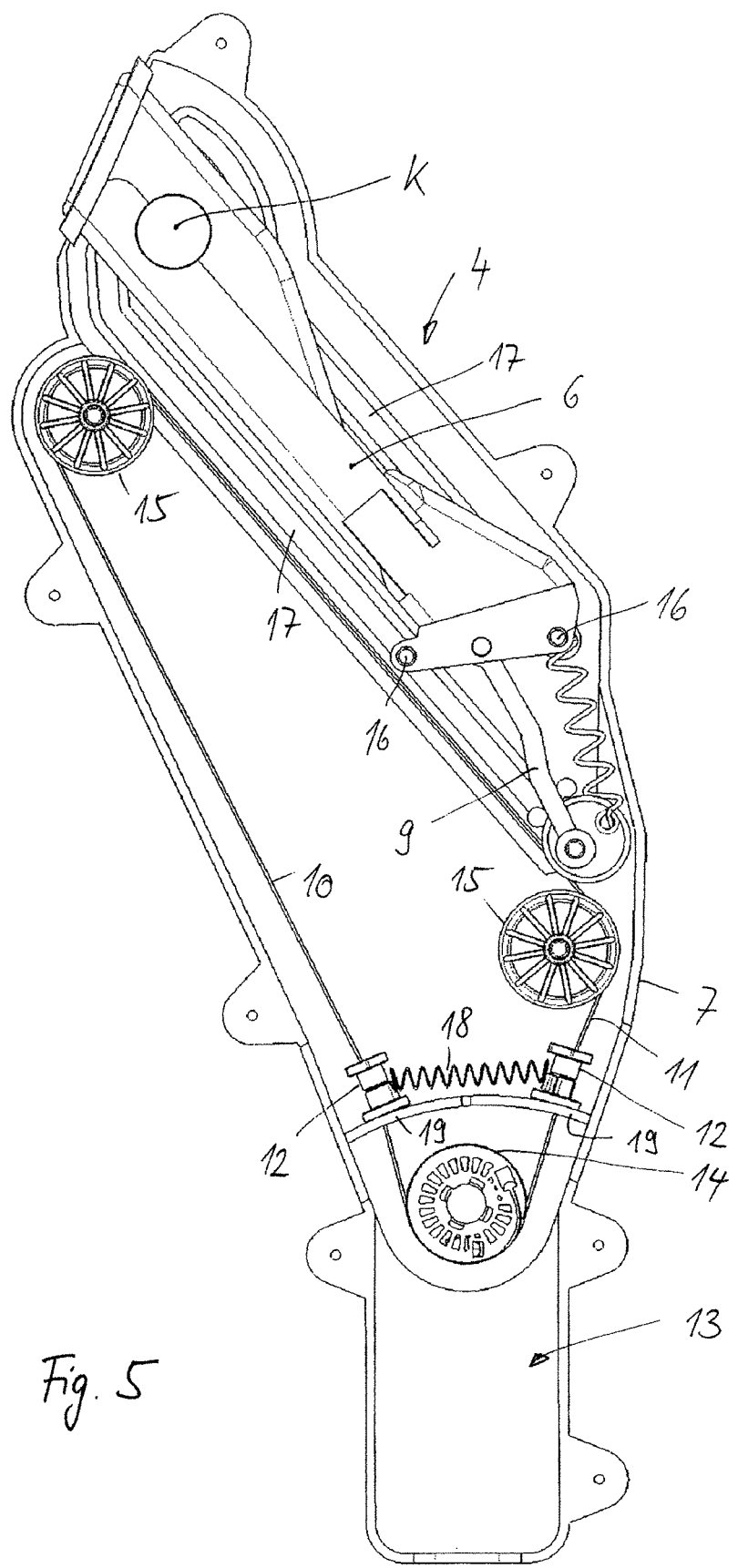
FIG. 5 shows an enlarged, cut-away illustration of the wing-mirror arrangement and the drive system according to FIGS. 2 to 4 in the rest position analogous to FIG. 2.

As can be seen with reference to FIG. 5, the two cable strands of the two cable-pull portions 10, 11 are oriented at an acute angle in relation to one another in the direction of the drive roller 14, and therefore extend in a V-shaped manner in the direction of the drive roller 14. The circulating cable-pull arrangement, which is formed by the cable-pull portions 10 and 11, is kept under tensioning by an elastically compliant securing device in the region of the drive roller 14, which serves as a deflecting roller for the cable strands, so that, on the one hand, the cable-pull arrangement can be subjected to constant cable tensioning and, on the other hand, the situation where the cable strands disengage from the drive roller 14 is avoided. The mechanical securing device has two sleeve-like sliders 12, which are mounted in a floating manner on the opposite cable-pull portions 10, 11 of the cable-pull arrangement. The two sleeve-like sliders 12 are connected to one another via a spring arrangement, in the present case a helical compression spring, the spring arrangement 18 being subjected to tensioning on a permanent basis.

In order to prevent the situation where, on account of the V-shaped orientation of the cable strands of the cable-pull arrangement relative to the drive roller 14, the two sliders 12 move in the direction of the drive roller 14 during operation of the cable-pull arrangement, and come into contact with the same, the two sliders 12 are assigned housing-mounted axial stops 19, which ensure that, even during operation of the cable-pull arrangement, the sliders 12 keep to a uniform distance from the drive roller 14. Since the cable strands of the cable-pull arrangement also diverge from one another in a V-shaped manner in the direction away from the drive roller 14, it is ensured that the sliders 12 do not move upward along the cable strands during operation of the cable-pull arrangement. This is because the permanent pre-tensioning of the spring arrangement 18 between the sliders 12 ensures that the sliders 12 are always subjected to resultant forces in the direction of the axial stops 19.

The invention claimed is:

1. A vehicle-bodywork part with a bodywork aperture and a wing-mirror arrangement with a carriage unit, the carriage unit carrying an optical detection device and can be displaced between a rest position, in which the carriage unit is recessed in a flush state in the bodywork aperture, and an operating position, in which the carriage unit has been extended out of the bodywork aperture in the outward direction, and a drive system is provided, the drive system being coupled to the carriage unit in order to displace the carriage unit between the rest position and the operating position, the drive system has a cable-pull arrangement deflected around at least one deflecting roller, and an elastically compliant securing device is provided, the securing device being tensioned between opposite cable strands of the cable-pull arrangement in the region of the deflecting roller, in order to avoid the situation where a cable strand disengages from the deflecting roller.

2. The vehicle-bodywork part according to claim 1, wherein the securing device has two sliders connected to one another via a spring arrangement and mounted in a floating manner on a respective cable strand, and each slider is assigned at least one stationary axial stop, the at least one stationary axial stop ensuring a constant spacing between the respective slider and the deflecting roller as seen in a longitudinal direction of the respective cable strand.

3. A wing-mirror arrangement for a vehicle-bodywork part with a bodywork aperture, wherein the wing-mirror arrangement has a carriage unit, the carriage unit carrying an optical detection device and being displaceable between a rest position, in which the carriage unit is recessed in a flush state in the bodywork aperture, and an operating position, in which the carriage unit has been extended out of the bodywork aperture in the outward direction, and a drive system is provided, the drive system being coupled to the carriage unit in order to displace the carriage unit between the rest position and the operating position, the drive system has a cable-pull arrangement deflected around at least one deflecting roller, and an elastically compliant securing device is provided, the securing device being tensioned between opposite cable strands of the cable-pull arrangement in the region of the deflecting roller in order to avoid the situation where a cable strand disengages from the deflecting roller.

4. The wing-mirror arrangement according to claim 3, wherein the securing device has two sliders connected to one another via a spring arrangement and mounted in a floating manner on a respective cable strand, and each slider is assigned at least one stationary axial stop, the at least one stationary axial stop ensuring a constant spacing stationary axial stop ensuring a constant spacing between the respective slider and the deflecting roller as seen in a longitudinal direction of the respective cable strand.

* * * * *